United States Patent
Lee et al.

(10) Patent No.: US 9,001,290 B2
(45) Date of Patent: Apr. 7, 2015

(54) POLARIZER, DISPLAY PANEL HAVING THE SAME AND METHOD OF MANUFACTURING THE SAME

(71) Applicant: Samsung Display Co., Ltd., Yongin, Gyeonggi-Do (KR)

(72) Inventors: Dae-Young Lee, Suwon-si (KR); Moon-Jung An, Seoul (KR); Su-Mi Lee, Hwaseong-si (KR); Gug-Rae Jo, Asan-si (KR); Eun-Jung Kim, Suwon-si (KR); Jung-Gun Nam, Seoul (KR); Dae-Hwan Jang, Gwangmyeong-si (KR); Hyung-Bin Cho, Seongnam-si (KR); Atsushi Takakuwa, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 131 days.

(21) Appl. No.: 13/680,817

(22) Filed: Nov. 19, 2012

(65) Prior Publication Data
US 2014/0016059 A1   Jan. 16, 2014

(30) Foreign Application Priority Data
Jul. 10, 2012   (KR) .......................... 10-2012-0074938

(51) Int. Cl.
*G02F 1/1335* (2006.01)
*G02B 5/30* (2006.01)

(52) U.S. Cl.
CPC ........ *G02B 5/3058* (2013.01); *G02F 1/133528* (2013.01); *G02F 2001/133548* (2013.01)

(58) Field of Classification Search
CPC ................. G02B 5/3058; G02F 2001/133548; G02F 1/133548

USPC ................................................ 349/96, 46, 51
See application file for complete search history.

(56) References Cited

U.S. PATENT DOCUMENTS

| | | | |
|---|---|---|---|
| 2002/0122235 A1* | 9/2002 | Kurtz et al. | 359/254 |
| 2005/0243447 A1* | 11/2005 | Lee et al. | 359/865 |
| 2006/0056024 A1* | 3/2006 | Ahn et al. | 359/486 |
| 2008/0299467 A1* | 12/2008 | Kim et al. | 430/5 |
| 2009/0009865 A1* | 1/2009 | Nishida et al. | 359/486 |
| 2009/0066885 A1* | 3/2009 | Kumai | 349/96 |
| 2010/0182540 A1* | 7/2010 | Mifune et al. | 349/65 |
| 2011/0285942 A1* | 11/2011 | Guo et al. | 349/96 |
| 2012/0169972 A1* | 7/2012 | Jung et al. | 349/96 |
| 2012/0206678 A1* | 8/2012 | Kim et al. | 349/106 |
| 2013/0040052 A1* | 2/2013 | Akita et al. | 427/163.1 |
| 2013/0271834 A1* | 10/2013 | Kim et al. | 359/485.05 |

FOREIGN PATENT DOCUMENTS

| | | | | |
|---|---|---|---|---|
| JP | 2006-343559 | * | 12/2006 | G02B 5/30 |
| JP | 2007-010713 | * | 1/2007 | G02B 5/30 |
| JP | 2007010713 A | | 1/2007 | |
| KR | 100741343 B1 | | 7/2007 | |
| KR | 1020080082116 A | | 9/2008 | |

\* cited by examiner

*Primary Examiner* — Edward Glick
*Assistant Examiner* — Sang V Nguyen
(74) *Attorney, Agent, or Firm* — Cantor Colburn LLP

(57) ABSTRACT

A polarizer includes a substrate, and a first metal layer and a second metal layer disposed on the substrate. The first metal layer includes a plurality of protrusions of a wire grid pattern. Each protrusion has a first width and adjacent protrusions are spaced apart by a second width. The second metal layer is disposed on each of the protrusions of the first metal layer, and includes molybdenum (Mo) and/or titanium (Ti).

19 Claims, 14 Drawing Sheets

POLARIZER, DISPLAY PANEL HAVING THE SAME AND METHOD OF MANUFACTURING THE SAME

This application claims priority to Korean Patent Application No. 10-2012-0074938, filed on Jul. 10, 2012, and all the benefits accruing therefrom under 35 U.S.C. §119, the contents of which are incorporated by reference herein in their entireties.

BACKGROUND

1. Field

Exemplary embodiments of the invention relate to a polarizer, a display panel having the polarizer, and a method of manufacturing the polarizer.

More particularly, exemplary embodiments of the invention relate to a wire grid polarizer for a liquid crystal display apparatus, a display panel having the wire grid polarizer, and a method of manufacturing the wire grid polarizer.

2. Description of the Related Art

A liquid crystal display apparatus having light weight and small size has been manufactured. A cathode ray tube ("CRT") display apparatus has been used due to a performance and a competitive price. However the CRT display apparatus has a weakness with a size or portability thereof. Therefore, the liquid crystal display apparatus has been highly regarded due to a small size, light weight and low-power-consumption thereof.

The liquid crystal display apparatus applies a voltage to a specific molecular arrangement of an optical material therein, such as liquid crystal, and is configured to change the molecular arrangement of the liquid crystal. The liquid crystal display apparatus displays an image using changes of optical property (for example, birefringence, rotatory polarization, dichroism and light scattering) of a liquid crystal cell according to the changes of the molecular arrangement of the liquid crystal.

The liquid crystal display apparatus includes a polarizing plate to control an array of the molecular arrangement of the liquid crystal. A typical polarizing plate passes polarized light which is parallel with a transmission axis, and absorbs polarized light which is perpendicular to the transmission axis. The typical polarizing plate absorbs some of the light from a light source of the liquid crystal display apparatus. Thus, light efficiency of the liquid crystal display apparatus may be undesirably decreased.

SUMMARY

One or more exemplary embodiment of the invention provides a polarizer capable of improving reliability.

One or more exemplary embodiment of the invention also provides a display panel having the polarizer.

One or more exemplary embodiment of the invention also provides a method of manufacturing the polarizer.

According to an exemplary embodiment of the invention, a polarizer includes a substrate, a first metal layer and a second metal layer disposed on the substrate. The first metal layer includes a plurality of protrusions of a wire grid pattern, where each protrusion has a first width and adjacent protrusions are spaced apart by a second width. The second metal layer is disposed on each of the protrusions of the first metal layer, and includes molybdenum (Mo) and/or titanium (Ti).

In an exemplary embodiment, a thickness of the second metal layer may be about 10 nanometers (nm) to about 20 nm.

In an exemplary embodiment, a ratio of the first width to the second width may be about 1:1.

In an exemplary embodiment, a ratio of the first width to a thickness of the first metal layer may be about 1:1.

In an exemplary embodiment, the first width may be about 30 nm to about 60 nm

In an exemplary embodiment, the first metal layer includes a first metal material and the second metal layer includes a second metal material. Providing a polymer material on the first and second metal materials forms a polymer layer, applying a mold to the polymer layer in a nano-imprint method forms a polymer layer pattern, and removing portions of the polymer layer pattern, the first metal material and the second metal material forms the plurality of protrusions of the wire grid pattern.

In an exemplary embodiment, the first metal layer may include any one selected from (Al), gold (Au), silver (Ag), copper (Cu), chrome (Cr), steel (Fe) and nickel (Ni) and a combination thereof.

In an exemplary embodiment, the polarizer may further include a hard mask disposed on the second metal layer, and including silicon oxide (SiOx).

In an exemplary embodiment, the polarizer may further include a protecting layer covering the first and second metal layers.

According to another exemplary embodiment of the invention, a display panel includes an array substrate, an opposite substrate and a liquid crystal layer disposed between the array substrate and the opposite substrate. The array substrate includes a lower polarizer including a first substrate, a lower first metal layer disposed on the first substrate and including a plurality of protrusions of a lower wire grid pattern, where each protrusion has a first width and adjacent protrusions are spaced apart by a second width, a lower second metal layer disposed on each of the protrusions of the lower first metal layer, and including molybdenum (Mo) and/or titanium (Ti), a first insulating layer covering the lower first and the second metal layers, a gate electrode disposed on the first insulating layer, a gate insulating layer disposed on the gate electrode to insulate the gate electrode, a channel layer disposed on the gate insulating layer, source and drain electrodes disposed on the channel layer, and a protecting layer covering the source and drain electrodes. The opposite substrate includes and upper polarizer including a second substrate, an upper first metal layer disposed under the second substrate and including a plurality of protrusions of an upper wire grid pattern, an upper second metal layer disposed on each of the protrusions of the upper first metal layer, and including molybdenum (Mo) and/or titanium (Ti), a second insulating layer covering the upper first and the second metal layers.

In an exemplary embodiment, the upper and lower first metal layers may include any one selected from aluminum (Al), gold (Au), silver (Ag), copper (Cu), chrome (Cr), steel (Fe) and nickel (Ni) and a combination thereof.

In an exemplary embodiment, each of a thickness of the upper second metal layer and a thickness of the lower second metal layer may be about 10 nm to about 20 nm.

In an exemplary embodiment, the array substrate may further include a third substrate disposed between the first insulating layer and the gate electrode. The opposite substrate may further include a fourth substrate disposed under the second insulating layer.

According to still another exemplary embodiment of the invention, a display panel includes an array substrate, an opposite substrate and a liquid crystal layer disposed between the array substrate and the opposite substrate. The array substrate includes a lower polarizer including a first substrate, a lower second metal layer disposed under the first substrate, including molybdenum (Mo) and/or titanium (Ti), and including a plurality of protrusions of a lower wire grid pattern, where each of the protrusions has a first width and adjacent protrusions are spaced apart by a second width, and a lower first metal layer disposed under each of the protrusions of the lower second metal layer, a first insulating layer covering the lower first and the second metal layers, a gate electrode disposed on the first insulating layer, a gate insulating layer disposed on the gate electrode to insulate the gate electrode, a channel layer disposed on the gate insulating layer, source and drain electrodes disposed on the channel layer, and a protecting layer covering the source and drain electrodes. The upper polarizer includes a second substrate, an upper second metal layer disposed on the second substrate, including molybdenum (Mo) and/or titanium (Ti), and including a plurality of protrusions of an upper wire grid pattern, and an upper first metal layer disposed on each of the protrusions of the upper second metal layer, a second insulating layer covering the upper first and the second metal layers.

In an exemplary embodiment, the first metal layer may include aluminum (Al). Each of a thickness of the upper second metal layer and a thickness of the lower second metal layer may be about 10 nm to about 20 nm. A ratio of the first width to the second width may be about 1:1. The first width may be about 30 nm to about 60 nm.

According to still another exemplary embodiment of the invention, a method of manufacturing a polarizer includes forming a first metal layer on a substrate, forming a second metal layer including molybdenum (Mo) and/or titanium (Ti) on the first metal layer, forming a hard mask on the second metal layer, forming a polymer layer on the hard mask, forming a pattern including a plurality of protrusions in the polymer layer by contacting and pressing a mold to the polymer layer, removing a portion of the patterned polymer layer and a portion of the hard mask between the protrusions, removing a portion of the first metal layer and a portion of the second metal layer between the protrusions, and removing the polymer layer.

In an exemplary embodiment, the method may further include removing the hard mask after the removing the polymer layer.

In an exemplary embodiment, each of the protrusions may have a first width. Adjacent protrusions may be spaced apart by a second width. A ratio of the first width to the second width may be about 1:1.

In an exemplary embodiment, a thickness of the second metal layer may be about 10 nm to about 20 nm.

According to still another exemplary embodiment of the invention, a method of manufacturing a polarizer includes, forming a second metal layer including molybdenum (Mo) and/or titanium (Ti) on a substrate, forming a first metal layer on the second metal layer, forming a hard mask on the first metal layer, forming a polymer layer on the hard mask, forming a pattern including a plurality of protrusions on the polymer layer by contacting and pressing a mold to the polymer layer, removing a portion of the patterned polymer layer and a portion of the hard mask between the protrusions, removing a portion of the first metal layer and a portion of the second metal layer between the protrusions, and removing the polymer layer.

According to one or more exemplary embodiment of the invention, a polarizer includes a second metal layer disposed on a first metal layer, and the second metal layer includes molybdenum (Mo) and/or titanium (Ti). Thus, reliability of the polarizer may be improved by uniformly forming a metal layer of a wire grid pattern of the polarizer.

In addition, by adjusting a thickness of the second metal layer, contrast ratio, transmittance and reflectance of the polarizer may be optimized.

BRIEF DESCRIPTION OF THE DRAWINGS

The above and other features of the invention will become more apparent by describing in detail exemplary embodiments thereof with reference to the accompanying drawings, in which.

DETAILED DESCRIPTION

Figure 1:
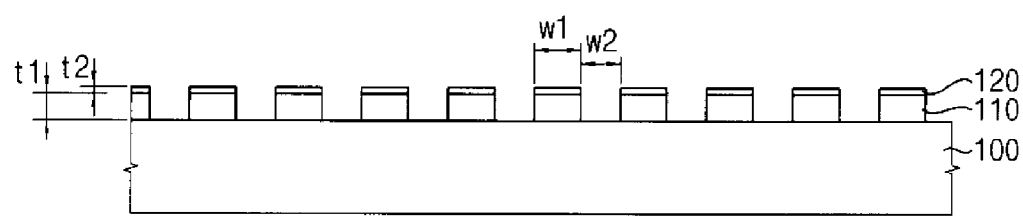
FIG. 1 is a cross-sectional view illustrating an exemplary embodiment of a polarizer according to the invention.

It will be understood that when an element or layer is referred to as being "on" or "connected to" another element or layer, the element or layer can be directly on, connected or coupled to another element or layer or intervening elements or layers. In contrast, when an element is referred to as being "directly on" or "directly connected to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "under" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

To increase light efficiency of a liquid crystal display apparatus, a wire grid polarizer has been developed. Manufacturing the wire grid polarizer may include a nano-imprint method, where a wire grid pattern may be made by direct contact of a mold. However, in such a method, reliability of the wire grid pattern may be undesirably decreased because of an uneven surface of the mold.

FIG. 1 is a cross-sectional view illustrating an exemplary embodiment of a polarizer according to the invention.

Referring to FIG. 1, the polarizer includes a substrate 100, a first metal layer 110 and a second metal layer 120.

The substrate 100 may include a material which has relatively high transmittance, thermal resistance and chemical resistance. In one exemplary embodiment, for example the substrate 100 may include any one selected from glass, polyethylenenaphthalate, polyethylene terephthalate, polyacryl and a combination thereof, but is not limited thereto or thereby.

The first metal layer 110 is disposed on the substrate 100 and is between the substrate 100 and the second metal layer 120. The first metal layer 110 includes a protrusion extending from the substrate 100, and has a first width w1. The first metal layer 110 may include a plurality of protrusions extending from the substrate 100. Protrusions adjacent each other are spaced apart from each other by a second width w2. The first metal layer 110 has a first thickness t1 and the second metal layer 220 has a second thickness t2. The protrusions of the first metal layer 110 collectively form a wire grid with the second metal layer 120. The first metal layer 110 may include any one selected from aluminum (Al), gold (Au), silver (Ag), copper (Cu), chrome (Cr), steel (Fe) and nickel (Ni) and a combination thereof.

The second width w2 may be smaller than a wavelength of an incident light to polarize the incident light. In one exemplary embodiment, for example, when the incident light is a visible light, the wavelength of the incident light is about 400 nanometers (nm) to about 700 nm, so that the second width w2 may be smaller than about 400 nm. In another exemplary embodiment, the second width w2 may be smaller than about 100 nm to improve performance of the polarizer. In one exemplary embodiment, the first width w1 of the protrusion may be smaller than about 100 nm. In addition, the first thickness t1 of the first metal layer 110 may be about 100 nm to about 250 nm to improve a transmittance of polarized light through the wire grid. In one exemplary embodiment, the first thickness t1 of the first metal layer 110 may be about 150 nm.

The second metal layer 120 is disposed on the first metal layer 110. The second metal layer 120 may include molybdenum (Mo) and/or titanium (Ti), but is not limited thereto or thereby. In one exemplary embodiment, a thickness of the second metal layer 120 may be about 10 nm to about 20 nm. Trait changes of the polarizer according to the thickness t2 of the second metal layer 120 will be described in FIGS. 7A to 9C.

Figure 2:
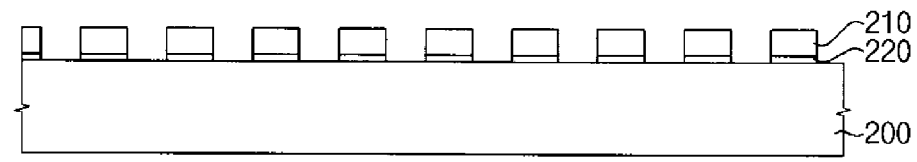
FIG. 2 is a cross-sectional view illustrating another exemplary embodiment of a polarizer according to the invention.

FIG. 2 is a cross-sectional view illustrating another exemplary embodiment a polarizer according to the invention.

Referring to FIG. 2, the polarizer includes a substrate 200, a second metal layer 220 and a first metal layer 210.

The substrate 200 may include a material which has relatively high transmittance, thermal resistance and chemical resistance. In one exemplary embodiment, for example the substrate 200 may include any one selected from glass, polyethylenenaphthalate, polyethylene terephthalate, polyacryl and a combination thereof.

The second metal layer 220 is disposed on the substrate 200 and is between the substrate 200 and the first metal layer 210. The second metal layer 220 includes a protrusion extending from the substrate 100 and has a first width (refers to w1 of FIG. 1). The second metal layer 220 may include a plurality of protrusions. Protrusions adjacent each other are spaced apart from each other by a second width (refers to w2 of FIG. 1). The second metal layer 220 has a second thickness (refers to t2 of FIG. 1). The protrusions of the second metal layer 220 collectively form a wire grid with the first metal layer 210. The second metal layer 220 may include molybdenum (Mo) and/or titanium (Ti). In one exemplary embodiment, the thickness t2 of the second metal layer 220 may be about 10 nm to about 20 nm.

The first metal layer 210 is disposed on the second metal layer 220. The first metal layer 110 may include any one selected from aluminum (Al), gold (Au), silver (Ag), copper (Cu), chrome (Cr), steel (Fe) and nickel (Ni) and a combination thereof.

The first thickness (refers to t1 of FIG. 1) of the first metal layer 210 may be about 100 nm to about 250 nm. In one exemplary embodiment, the first thickness (refers to t1 of FIG. 1) of the first metal layer 210 may be about 150 nm.

FIGS. 3A to 3H are cross-sectional views explaining an exemplary embodiment of a method of manufacturing the polarizer of FIG. 1.

Figure 3A:
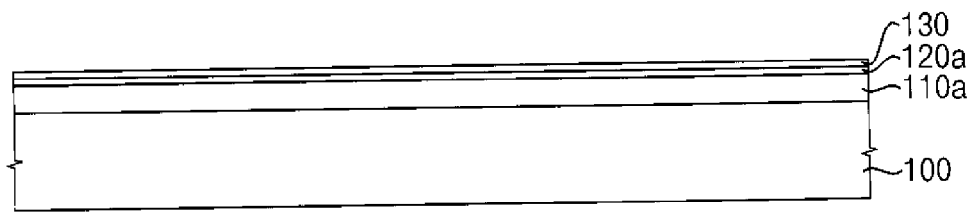
FIGS. 3A to 3H are cross-sectional views explaining an exemplary embodiment of a method of manufacturing the polarizer of FIG. 1.

Referring to FIG. 3A, a first metal material layer 110a is formed on a substrate 100. The substrate 100 may include a material which has relatively high transmittance, thermal resistance and chemical resistance. In one exemplary embodiment, for example, the substrate 100 may include any one selected from glass, polyethylenenaphthalate, polyethylene terephthalate, polyacryl and a combination thereof. The first metal material layer 110a may include any one selected from aluminum (Al), gold (Au), silver (Ag), copper (Cu), chrome (Cr), steel (Fe) and nickel (Ni) and a combination thereof. The first metal material layer 110a may be formed by a deposition, but is not limited thereto or thereby. In one exemplary embodiment, for example, the first metal material layer 110a may be formed by a chemical vapor deposition process. A thickness of the first metal material layer 110a may be about 100 nm to about 250 nm. In one exemplary embodiment, the thickness of the first metal material layer 110a may be about 150 nm.

Figure 3B:
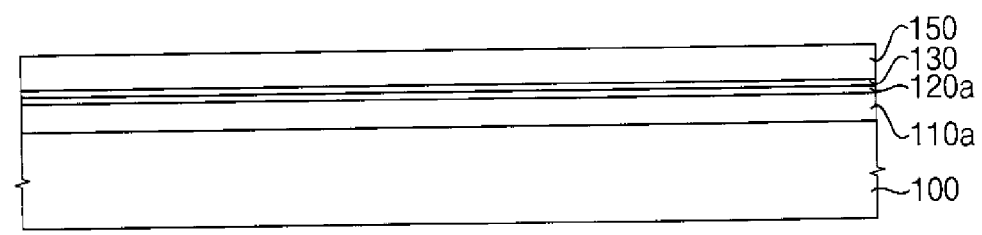
Figure 3C:
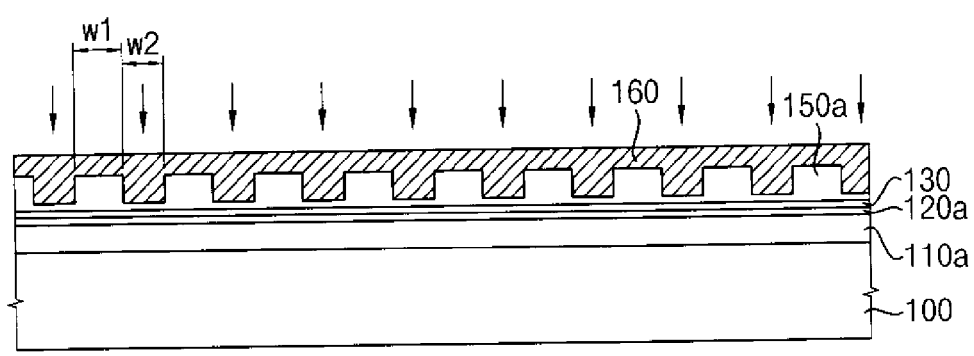

The thickness of the first metal material layer 110a may be decided in consideration of a first width (refers to w1 in FIG. 3C). In consideration of a grid width for polarization and strength of the grid structure, the thickness of the first metal material layer 110a may be about three times greater than the first width (refers to w1 of FIG. 3C) and/or the second width (refers to w2 of FIG. 3C).

A second metal material layer 120a is formed on the first metal material layer 110a. The second metal material layer 120 may include molybdenum (Mo) and/or titanium (Ti), but is not limited thereto or thereby. The second metal material layer 120a may be formed by a chemical vapor deposition, but is not limited thereto or thereby. In one exemplary embodiment, a thickness of the second metal material layer 120a may be about 10 nm to about 20 nm.

A hard mask 130 is formed on the second metal material layer 120a. The hard mask 130 may include silicon oxide (SiOx). In one exemplary embodiment, for example, the hard mask 130 may include silicon dioxide (SiO2). The hard mask 130 may formed by a deposition, but is not limited thereto or thereby. In one exemplary embodiment, for example, the hard mask 130 may formed by a chemical vapor deposition process.

Due to the second metal material layer 120a, surface roughness of the hard mask 130 may be smaller than that of a typical polarizer which does not include the second metal material layer 120a. Table 1 show a result of an experiment about roughness of the hard mask 130.

TABLE 1

|  | size | position | roughness (roughness) [nm] | roughness (Rp-v) [nm] | RMS roughness (Root mean square of roughness) [nm] |
| --- | --- | --- | --- | --- | --- |
| typical polarizer (Al + SiO2) | 3 | 1 | 4.38 | 189.70 | 6.26 |
|  | 3 | 2 | 4.55 | 164.10 | 6.99 |
|  | 3 | 3 | 4.18 | 128.80 | 6.40 |
|  |  | average | 4.37 | 160.87 | 6.55 |
| Exemplary embodiment (Al + Mo + SiO2) | 3 | 1 | 3.56 | 77.69 | 4.81 |
|  | 3 | 2 | 3.62 | 98.27 | 4.69 |
|  | 3 | 3 | 3.60 | 62.07 | 4.61 |
|  |  | average | 3.59 | 79.34 | 4.70 |

In the experiment, the second metal material layer 120a includes of molybdenum (Mo), the size represents a size of a portion of the hard mask 130 at which the roughness is measured, and the position represents a random position of the hard mask 130 at which the roughness is measured.

Referring to FIG. 3B, a polymer layer 150 is formed on the hard mask 130. The polymer layer 150 may include thermosetting resin and/or photocurable resin, but is not limited thereto or thereby. In one exemplary embodiment, for example, the thermosetting resin may include urea resin, melamine resin, phenol resin, etc. In addition, the photocurable resin may include polymerizable compounds having a polymerizable functional group, a photopolymerization initiator initiating polymerization of the polymerizable compounds by irradiation, surfactants, antioxidants, etc.

Referring to FIG. 3C, a mold 160 makes contact with the polymer layer 150, and the mold 160 is pressed toward the polymer layer 150 as indicated by the downward arrows, so that a pattern is formed in the polymer layer 150. The mold 160 has a plurality of grooves having a first width w1. Grooves adjacent each other are spaced apart from each other by a second width w2. Thus, the polymer layer 150 pressed by the mold 160 has a plurality of protrusions having the first width w1, and the protrusions adjacent each other are spaced apart from each other by the second width w2. A ratio of the first width w1 to the second width w2 may be about 1:1. In one exemplary embodiment, for example, the first width w1 may be about 30 nm to about 60 nm, and the second width w2 may be about 30 nm to about 60 nm. In one exemplary embodiment, the first width w1 may be about 50 nm, and the second width w2 may be about 50 nm.

In one exemplary embodiment, when the polymer layer 150 includes the thermosetting resin, the mold 160 may include material which has relatively low coefficient of thermal expansion such as metal. When the polymer layer 150 includes the photocurable resin, the mold 160 may include material which has relatively high light-transmittance and strength such as a transparent macromolecule.

When the polymer layer 150 includes the thermosetting resin, the mold 160 makes contact with the polymer layer 150, and then the polymer layer 150 is heated to a temperature over a glass transition temperature of the thermosetting resin. After that, the mold 160 is pressed toward the polymer layer 150, so that the pattern of the mold 160 is imprinted in the polymer layer 150. The polymer layer 150 is cooled to a temperature under the glass transition temperature, so that the patterned polymer layer 150a is hardened.

In another exemplary embodiment, when the polymer layer 150 includes the photocurable resin, the mold 160 makes contact with the polymer layer 150, and then the mold 160 is pressed toward the polymer layer 150, so that the pattern of the mold 160 is imprinted in the polymer layer 150. The mold 160 includes the material which has high light-transmittance, so that the polymer layer 150 may be light irradiated. The patterned polymer layer 150a may be hardened, after the polymer layer 150 is light irradiated.

Figure 3D:
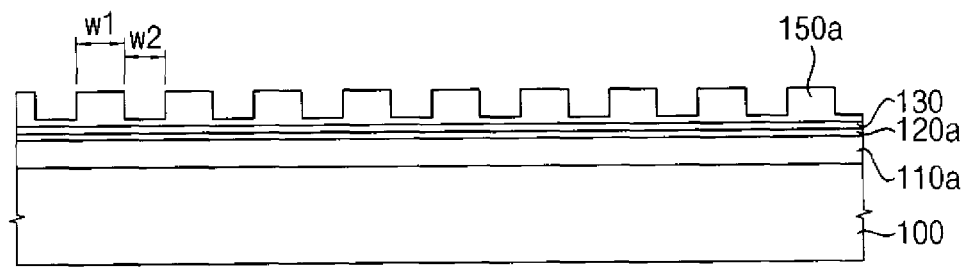

Referring to FIG. 3D, the mold 160 is removed from the patterned polymer layer 150a which is hardened. The patterned polymer layer 150a has a plurality of protrusions having the first width w1. Protrusions adjacent each other are spaced apart from each other by the second width w2. By forming a shape of the mold 160 appropriately, sizes of the first width w1 and the second width w2 may be appropriately adjusted.

Figure 3E:
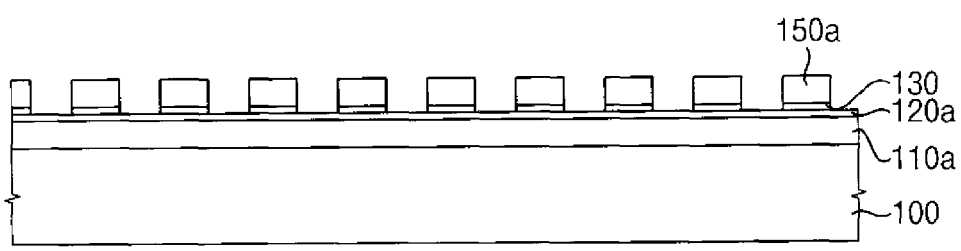

Referring to FIG. 3E, the patterned polymer layer 150a and the hard mask 130 are partially removed. In one exemplary embodiment, for example, the patterned polymer layer 150a and the hard mask 130 may be dry etched. Where the patterned polymer layer 150a has the protrusions, portions of the patterned polymer layer 150a and the hard mask 130 which are between the protrusions are removed by the etching. Thus, the protrusions of the patterned polymer layer 150a remain, and the second metal material layer 120a corresponding to the portions between the protrusions of the patterned polymer layer 150a is exposed.

Figure 3F:
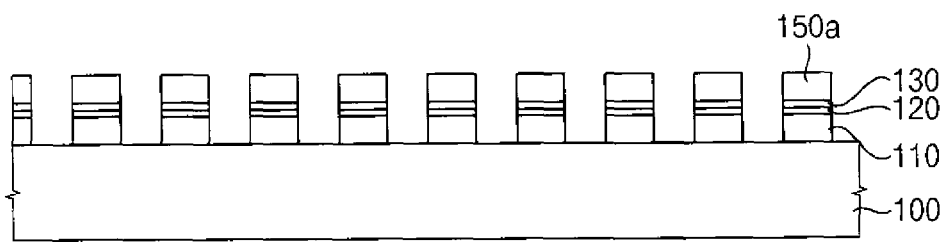

Referring to FIG. 3F, the second metal layer 120a and the first metal material layer 110a are etched. An exposed portion of the second metal material layer 120 and a portion of the first metal material layer 110 corresponding to the exposed portion of the second metal material layer 120a are etched, so that a wire grid pattern is formed. A size of the wire grid pattern may be adjusted by controlling thicknesses of the first metal material layer 110a and the second metal material layer 120a, and the first width w1 and the second width w2 of the mold 160.

Figure 3G:
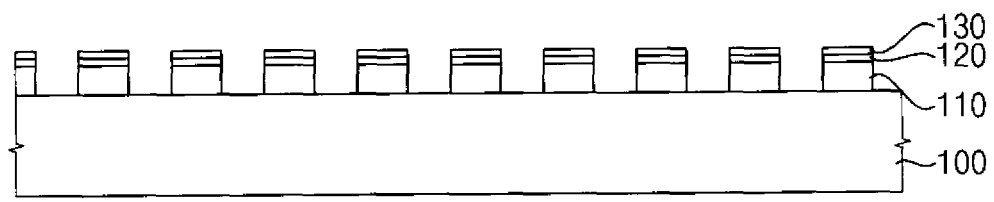

Referring to FIG. 3G, a remaining portion of the patterned polymer layer 150a is removed.

Figure 3H:
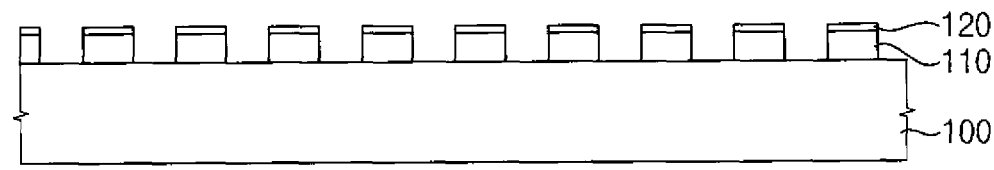

Referring to FIG. 3H, a remaining portion of the hard mask 130 is removed. In addition, when the polarizer is used for light passing in a direction from the substrate 100 to the second metal layer 120, the hard mask 130 may be maintained. Since the hard mask 130 is irrelevant to the direction of light, a process of removing the hard mask 130 may be omitted to simplify a manufacturing process.

FIGS. 4A to 4F are cross-sectional views explaining an exemplary embodiment of a method of manufacturing the polarizer of FIG. 2.

Figure 4A:
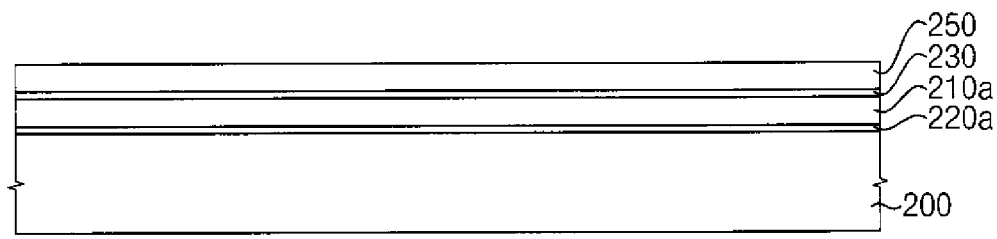
FIGS. 4A to 4F are cross-sectional views explaining an exemplary embodiment of a method of manufacturing the polarizer of FIG. 2.

Referring to FIG. 4A, a second metal material layer 220a is disposed on a substrate 200. The substrate 200 may include a material which has relatively high transmittance, thermal resistance and chemical resistance. In one exemplary embodiment, for example the substrate 100 may include any one selected from glass, polyethylenenaphthalate, polyethylene terephthalate, polyacryl and a combination thereof. The second metal material layer 220a may include molybdenum (Mo) and/or titanium (Ti), but is not limited thereto or thereby. The second metal material layer 220a may be formed by a chemical vapor deposition process. In one exemplary embodiment a thickness of the second metal material layer 220a may be about 10 nm to about 20 nm.

A first metal material layer 210a is formed on the second metal material layer 220a. The first metal material layer 210a may include any one selected from aluminum (Al), gold (Au), silver (Ag), copper (Cu), chrome (Cr), steel (Fe) and nickel (Ni) and a combination thereof. The first metal material layer 210a may be formed by a deposition, but is not limited thereto or thereby. In one exemplary embodiment, for example, the first metal material layer 210a may be formed by a chemical vapor deposition process. A thickness of the first metal material layer 210a may be about 100 nm to about 250 nm. In one exemplary embodiment, the thickness of the first metal material layer 210a may be about 150 nm.

Figure 4B:
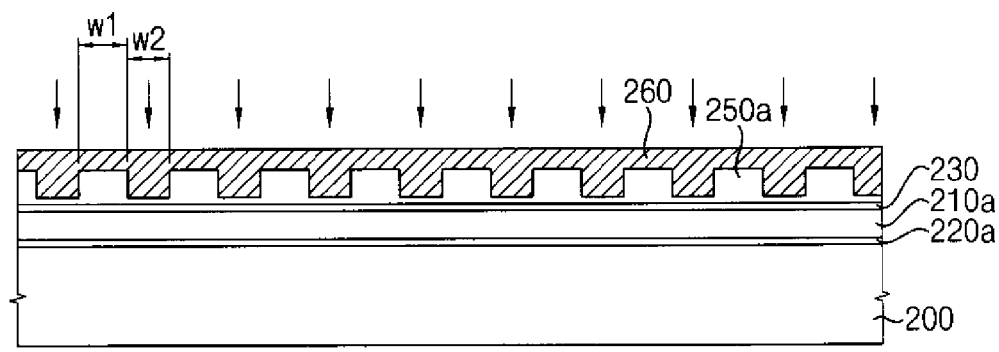

The thickness of the first metal material layer 210a may be decided in consideration of a first width (refers to w1 in FIG. 4B). In consideration of a grid width for polarization and strength of the grid structure, the thickness of the first metal material layer 210a may be about three times greater than the first width (refers to w1 of FIG. 4B) and/or the second width (refers to w2 of FIG. 4B).

A hard mask 230 is formed on the first metal material layer 210a. The hard mask 230 may include silicon oxide (SiOx). In one exemplary embodiment, for example, the hard mask 230 may include silicon dioxide (SiO2). The hard mask 230 may formed by a deposition, but is not limited thereto or thereby. In one exemplary embodiment, for example, the hard mask 230 may formed by a chemical vapor deposition process.

A polymer layer 250 is formed on the hard mask 230. The polymer layer 250 may include thermosetting resin and/or photocurable resin, but is not limited thereto or thereby. In one exemplary embodiment, for example, the thermosetting resin may include urea resin, melamine resin, phenol resin, etc. In addition, the photocurable resin may include polymerizable compounds having polymerizable functional group, a photopolymerization initiator initiating polymerization of the polymerizable compounds by irradiation, surfactants, antioxidants, etc.

Referring to FIG. 4B, a mold 260 makes contact with the polymer layer 250, and the mold 260 is pressed toward the polymer layer 250, so that a pattern is formed in the polymer layer 250. The mold 260 has a plurality of grooves having a first width w1. Grooves adjacent each other are spaced apart from each other by a second width w2. Thus, the patterned polymer layer 250a has a plurality of protrusions having the first width w1, and the protrusions adjacent each other are spaced apart from each other by the second width w2. A ratio of the first width w1 to the second width w2 may be about 1:1. In one exemplary embodiment, for example, the first width w1 may be about 30 nm to about 60 nm, and the second width w2 may be about 30 nm to about 60 nm. In one exemplary embodiment, the first width w1 may be about 50 nm, and the second width w2 may be about 50 nm.

In one exemplary embodiment, when the polymer layer 250 includes the thermosetting resin, the mold 260 may include material which has relatively low coefficient of thermal expansion such as metal. When the polymer layer 250 includes the photocurable resin, the mold 260 may include material which has relatively high light-transmittance and strength such as transparent macromolecule.

When the polymer layer 250 includes the thermosetting resin, the mold 260 makes contact with the polymer layer 250, and then the polymer layer 250 is heated to a temperature over a glass transition temperature of the thermosetting resin. After that, the mold 260 is pressed toward the polymer layer 250, so that the pattern of the mold 260 is imprinted in the polymer layer 250. The polymer layer 250 is cooled to a temperature under the glass transition temperature, so that the patterned polymer layer 250a is hardened.

In another exemplary embodiment, when the polymer layer 250 includes the photocurable resin, the mold 260 makes contact with the polymer layer 250, and then the mold 260 is pressed toward the polymer layer 250, so that the pattern of the mold 260 is imprinted in the polymer layer 250. The mold 260 includes the material which has high light-transmittance, so that the polymer layer 250 may be light irradiated. The patterned polymer layer 250a may be hardened, after the polymer layer 250 is light irradiated.

Figure 4C:
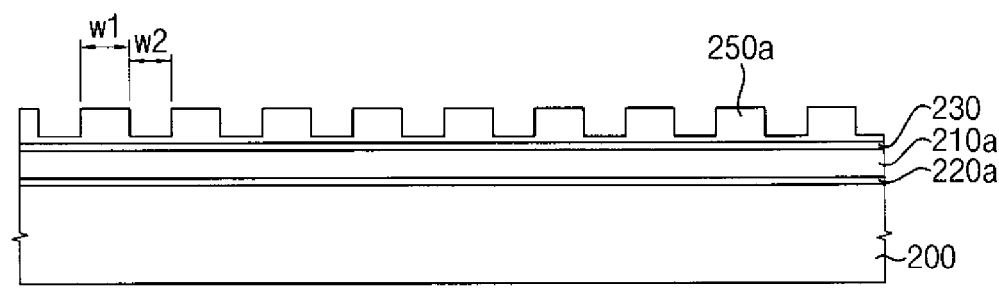

Referring to FIG. 4C, the mold 260 is removed from the patterned polymer layer 250a which is hardened. The patterned polymer layer 250a has a plurality of protrusions having the first width w1. Protrusions adjacent each other are spaced apart from each other by the second width w2. By forming a shape of the mold 260 appropriately, sizes of the first width w1 and the second width w2 may be appropriately adjusted.

Figure 4D:
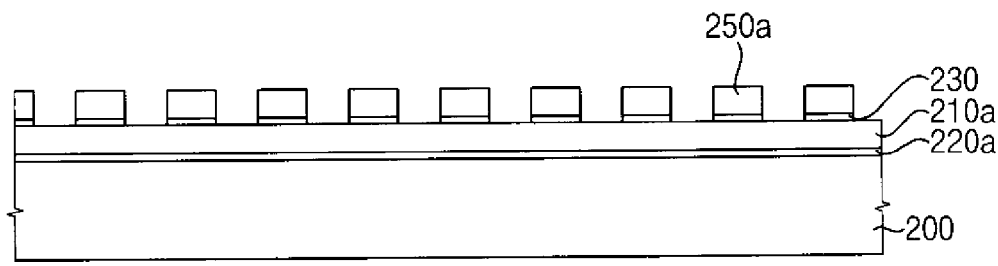

Referring to FIG. 4D, the patterned polymer layer 250a and the hard mask 230 are partially removed. In one exemplary embodiment, for example, the patterned polymer layer 250a and the hard mask 230 may be dry etched. Where the patterned polymer layer 250a has the protrusions, portions of the patterned polymer layer 250a and the hard mask 230 which are between the protrusions are removed by the etching. Thus, the protrusions of the patterned polymer layer 250a remain, and the first metal material layer 210 corresponding to the portions between the protrusions of the patterned polymer layer 250a is exposed.

Figure 4E:
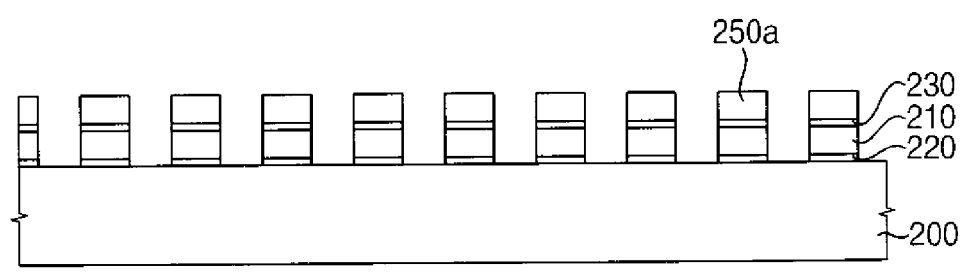

Referring to FIG. 4E, the first metal material layer 210a and the second metal material layer 220a are etched. An exposed portion of the first metal material layer 210a and a portion of the second metal material layer 220a corresponding to the exposed portion of the first metal material layer 210a are etched, so that a wire grid pattern is formed. A size of the wire grid pattern may be adjusted by controlling thicknesses of the second metal material layer 220a and the first metal material layer 210a, and the first width w1 and the second width w2 of the mold 260.

Figure 4F:
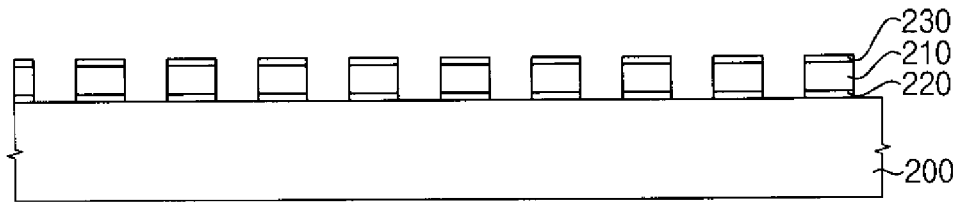

Referring to FIG. 4F, a remaining portion of the patterned polymer layer 250a is removed. Remaining portions of the hard mask 230 remain on the first metal layer 210.

Although not shown in figures, when the polarizer is used for light passing in a direction from the first metal layer 210 to the substrate 200, then the hard mask 230 may be removed (refers to FIG. 2).

Figure 5:
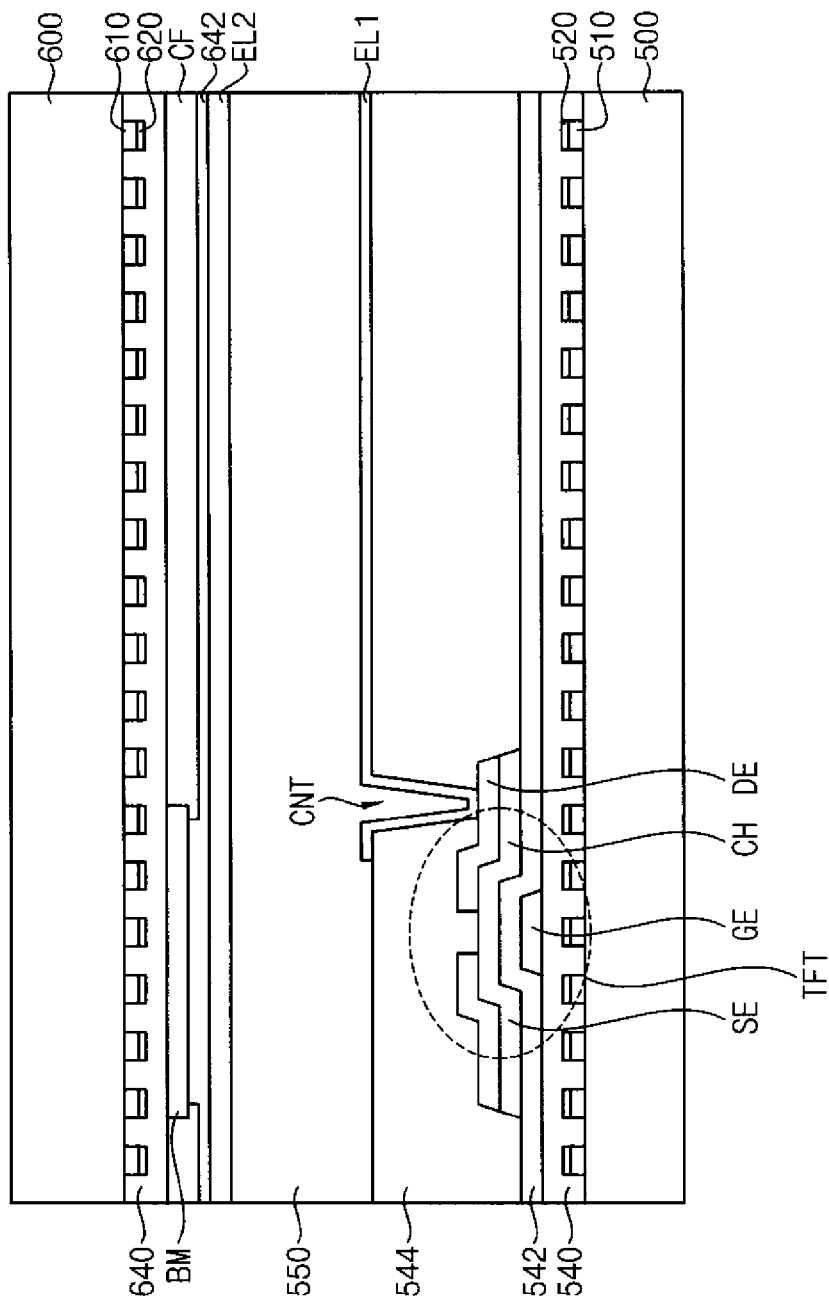
FIG. 5 is a cross-sectional view illustrating an exemplary embodiment of a display panel according to the invention.

FIG. 5 is a cross-sectional view illustrating an exemplary embodiment of a display panel of a display apparatus according to the invention.

The display panel includes an array substrate, an opposite substrate, and a liquid crystal layer 550 disposed between the array substrate and opposite substrate.

The array substrate includes a first substrate 500, a lower first metal layer 510, a lower second metal layer 520, a first insulating layer 540, a gate insulating layer 542, a thin film transistor TFT, a protecting layer 544 and a first electrode EL1.

The lower first metal layer 510 is disposed on the first substrate 500. The lower second metal layer 520 is disposed on the lower first metal layer 510. The lower first metal layer 510 and the lower second metal layer 520 form a lower wire grid pattern. The lower first metal layer 510 and the lower second metal layer 520 are substantially the same as the first metal layer 110 and the second metal layer 120 in FIG. 1. Thus any further detailed descriptions concerning the same elements will be omitted.

The first insulating layer 540 is disposed on the first substrate 500, on which the lower first metal layer 510 and the lower second metal layer 520 are disposed. The first insulating layer 540 may include silicon oxide (SiOx), but is not limited thereto or thereby.

A gate electrode GE and a gate line (not shown) are disposed on the first insulating layer 540. The display panel may include a plurality of gate electrodes GE and/or gate lines.

The gate insulating layer 542 is disposed on the first insulating layer 540, on which the gate electrode GE and the gate line are disposed. The gate insulating layer 542 may include inorganic material such as silicon oxide (SiOx) and silicon nitride (SiNx), but is not limited thereto or thereby.

A channel layer CH overlapping the gate electrode GE is disposed on the gate insulating layer 542.

The channel layer CH may include a semiconductor layer including amorphous silicon (a-Si:H), and an ohmic contact layer including n+ amorphous silicon (n+ a-Si:H). In addition, the channel layer CH may include an oxide semiconductor. The oxide semiconductor may include an amorphous oxide including any one selected from indium (In), zinc (Zn), gallium (Ga), tin (Sn) and hafnium (Hf) and a combination thereof. More particularly, the oxide semiconductor may include an amorphous oxide including indium (In), zinc (Zn) and gallium (Ga), or an amorphous oxide including indium (In), zinc (Zn) and hafnium (Hf). The oxide semiconductor may include an oxide such as indium zinc oxide ("InZnO"), indium gallium oxide ("InGaO"), indium tin oxide ("InSnO"), zinc tin oxide ("ZnSnO"), gallium tin oxide ("GaSnO") and gallium zinc oxide ("GaZnO").

A source electrode SE and a drain electrode DE are disposed on the channel layer CH. The source electrode SE may extend from a data line (not shown). The display panel may include a plurality of source electrodes SE, drain electrodes DE and/or data lines.

The gate electrode GE, the source electrode SE, the drain electrode DE and the channel layer CH collectively form the thin film transistor TFT.

The protecting layer 544 is disposed on the thin film transistor TFT. The protecting layer 544 may include inorganic material such as silicon oxide (SiOx) and silicon nitride (SiNx). In addition, the protecting layer 544 may include organic insulating material having relatively low permittivity. In addition, the protecting layer 544 may have a single layer structure, or a double layer structure of inorganic and organic insulating layers. The protecting layer 544 includes a contact hole CNT exposing a portion of the drain electrode DE.

The lower first metal layer 510 and the lower second metal layer 520 form the lower wire grid pattern. The lower wire grid pattern may be on substantially an entire of the array substrate, or on less than an entire of the array substrate, such as on a pixel area of the display apparatus. The display apparatus may include a plurality of pixel areas defined therein. In a plan view of the display panel such as from below the first substrate 500, the lower wire grid pattern may have a longitudinal axis which extends in a direction which is perpendicular to, in parallel with or inclined with respect to the gate line, but the invention is not limited thereto or thereby.

The opposite substrate includes a second substrate 600, an upper first metal layer 610, an upper second metal layer 620, a second insulating layer 640, a black matrix BM, a color filter CF, an over-coating layer 642 and a second electrode EL2.

The second substrate 650 faces the first substrate 500.

The upper first metal layer 610 is disposed under the second substrate 650, taking the cross-sectional view in a direction from the second substrate 600 toward the second electrode EL2. The upper second metal layer 620 is disposed under the upper first metal layer 610. The upper first metal layer 610 and the upper second metal layer 620 form an upper wire grid pattern. The upper first metal layer 610 and the upper second metal layer 620 are substantially the same as the first metal layer 110 and the second metal layer 120 in FIG. 1. Thus any further detailed descriptions concerning the same elements will be omitted.

A second insulating layer 640 is disposed under the second substrate 650, on which the upper first metal layer 610 and the upper second metal layer 620 are disposed. The second insulating layer 640 may include silicon oxide (SiOx), but is not limited thereto or thereby.

The black matrix BM is disposed under the second insulating layer 640. The black matrix BM corresponds to an area except for the pixel area, and blocks light. Thus, in one exemplary embodiment, the black matrix BM overlaps the data line, the gate line and the thin film transistor TFT.

The color filter CF is disposed under the black matrix BM and the second insulating layer 640. The color filter CF effectively colors the light passing through the liquid crystal layer 550. The color filter CF may include a red color filter, a green color filter and a blue color filter, but is not limited thereto or thereby. The color filter CF corresponds to the pixel area. The display panel may include a plurality of color filters. Color filters adjacent to each other may have different colors from each other, but are not limited thereto or thereby. The color filter CF may overlap an adjacent color filter CF in a boundary of the pixel area. In addition, the color filter CF may be spaced apart from an adjacent color filter CF in the boundary of the pixel area.

The over-coating layer 642 is disposed under the black matrix BM. The over-coating layer 642 provides a substantially planar surface and flattens the stepped profile of the color filter CF, protects the color filter CF, and insulates the color filter CF. The over-coating layer 642 may include acrylic-epoxy material, but is not limited thereto or thereby.

The second electrode EL2 corresponds to the pixel area. The second electrode EL2 is electrically connected to a common voltage line (not shown). The second electrode EL2 may have a slit pattern such as including a plurality of openings. The second electrode EL2 may include a transparent conductive material, such as indium tin oxide ("ITO"), indium zinc oxide ("IZO") and etc.

The liquid crystal layer 550 is disposed between the array substrate and the opposite substrate. The liquid crystal layer 550 includes liquid crystal molecules having optical anisotropy. The liquid crystal molecules are driven by electric field, such as generated by voltages applied to the first and second electrodes EL1 and EL2, so that an image is displayed by passing or blocking light through the liquid crystal layer 550.

Figure 6:
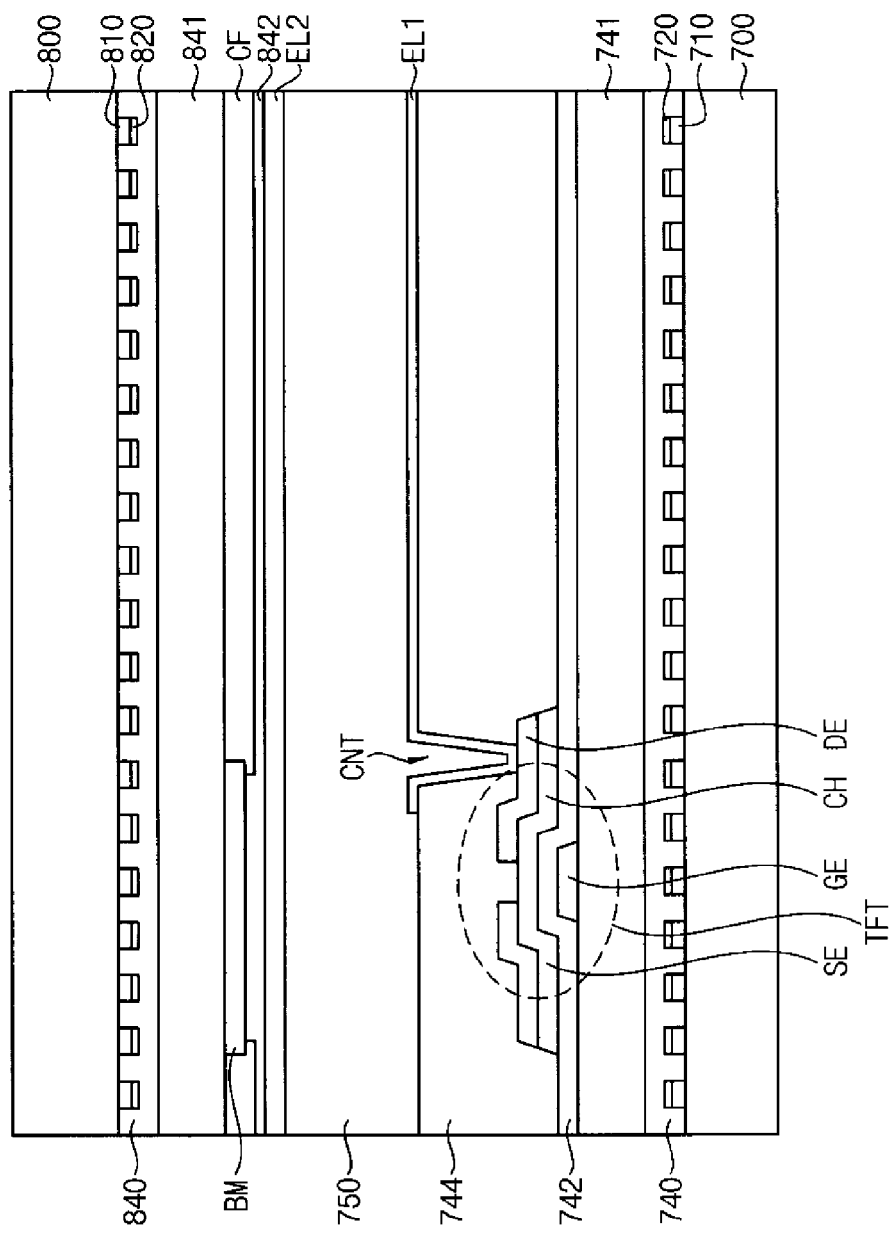
FIG. 6 is a cross-sectional view illustrating another exemplary embodiment of a display panel according to the invention.

FIG. 6 is a cross-sectional view illustrating another exemplary embodiment of a display panel according to the invention.

Referring to FIG. 6, the display panel is substantially the same as the display panel of FIG. 5, except for a first attachable-detachable (or insulating) layer 740, a third substrate 741, a second attachable-detachable (or insulating) layer 840 and a fourth substrate 841. Thus, any further detailed descriptions concerning the same elements will be omitted.

The display panel includes an array substrate, an opposite substrate, and a liquid crystal layer 750 disposed between the array substrate and opposite substrate. The array substrate includes the third substrate 741, a gate insulating layer 742, a thin film transistor TFT, a protecting layer 744 and a first electrode EL1. The opposite substrate includes the fourth substrate 841, a black matrix BM, a color filter CF, an over-coating layer 842 and a second electrode EL2.

The display panel further includes a lower polarizer and an upper polarizer. The lower polarizer and the upper polarizer are substantially same as the polarizer of FIG. 1. Thus, any further detailed descriptions concerning the same elements will be omitted.

The lower polarizer includes a first substrate 700, a lower first metal layer 710, a lower second metal layer 720 and the first attachable-detachable layer 740. The first attachable-detachable layer 740 includes an adhesive member to attach the lower polarizer to the third substrate 741. The third substrate 741 may be a transparent insulation substrate including, for example, glass and/or plastic.

The upper polarizer includes a second substrate 800, an upper first metal layer 810, an upper second metal layer 820 and the second attachable-detachable layer 840. The second attachable-detachable layer 840 includes an adhesive member to attach the upper polarizer to the fourth substrate 841. The fourth substrate 841 may be a transparent insulation substrate including, for example, glass and/or plastic.

Figure 7:
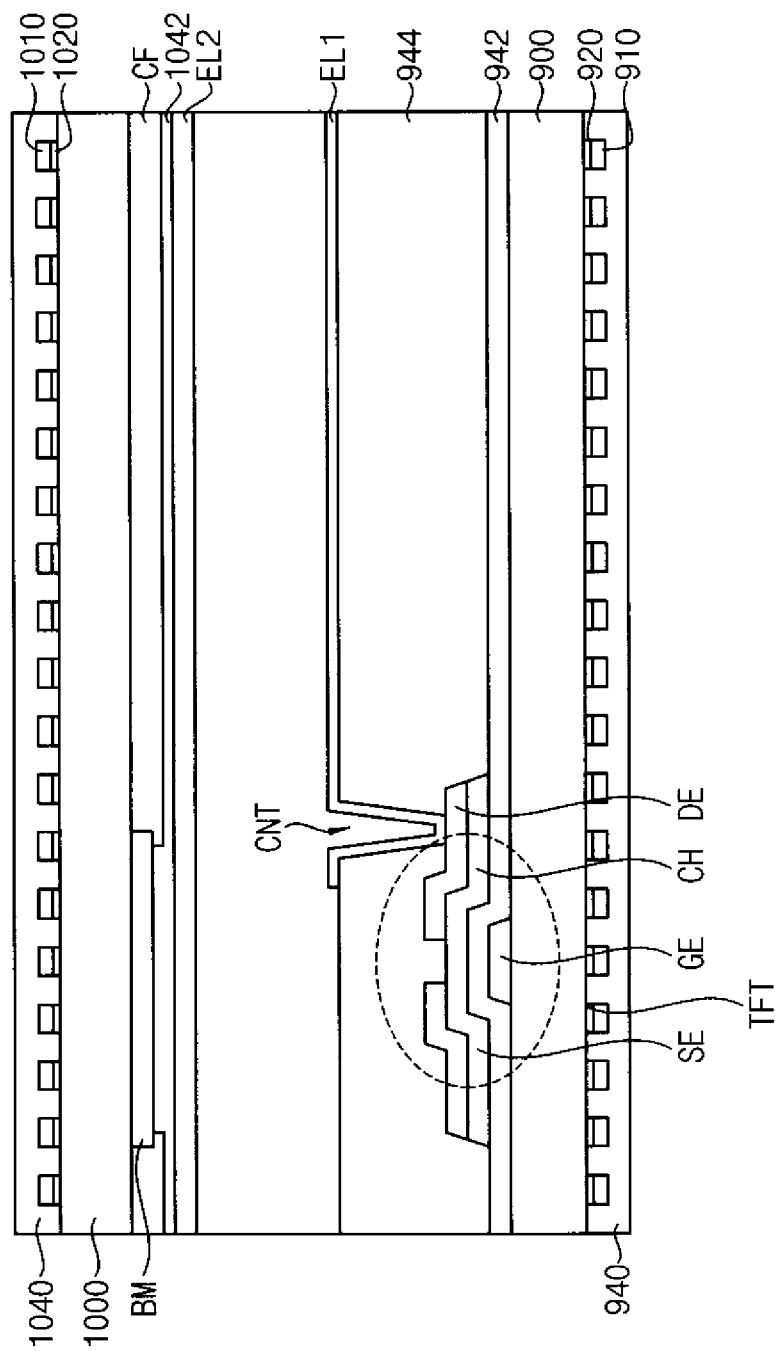
FIG. 7 is a cross-sectional view illustrating still another exemplary embodiment of a display panel according to the invention.

FIG. 7 is a cross-sectional view illustrating still another exemplary embodiment of a display panel according to the invention.

Referring to FIG. 7, the display panel is substantially same as the display panel of FIG. 5, except for a first substrate 900, a lower first metal layer 910, a lower second metal layer 920, a lower protecting layer 940, a second substrate 1000, an upper first metal layer 1010, an upper second metal layer 1020 and an upper protecting layer 1040. Thus, any further detailed descriptions concerning the same elements will be omitted.

The display panel includes an array substrate, an opposite substrate, and a liquid crystal layer disposed between the array substrate and opposite substrate. The array substrate includes the first substrate 900, a gate insulating layer 942, a thin film transistor TFT, a protecting layer 944 and a first electrode EL1. The opposite substrate includes the second substrate 1000, a black matrix BM, a color filter CF, an over-coating layer 1042 and a second electrode EL2.

The display panel further includes a lower polarizer and an upper polarizer. The lower polarizer and the upper polarizer are substantially same as the polarizer of FIG. 1. Thus, any further detailed descriptions concerning the same elements will be omitted.

The lower polarizer includes the first substrate 900, the lower first metal layer 910, the lower second metal layer 920 and the lower protecting layer 940. The lower second metal layer 920 is disposed under the first substrate 900. The lower first metal layer 910 is disposed under the lower second metal layer 920. The lower protecting layer 940 covers and protects a lower wire grid collectively formed by the lower first metal layer 910 and the lower second metal layer 920.

The upper polarizer includes the second substrate 1000, the upper first metal layer 1010, the upper second metal layer 1020 and the upper protecting layer 1040. The upper second metal layer 1020 is disposed on the second substrate 1000. The upper first metal layer 1010 is disposed on the upper second metal layer 1020.

The upper protecting layer 1040 covers and protects an upper wire grid collectively formed by the upper first metal layer 1010 and the upper second metal layer 1020.

Figure 8A:
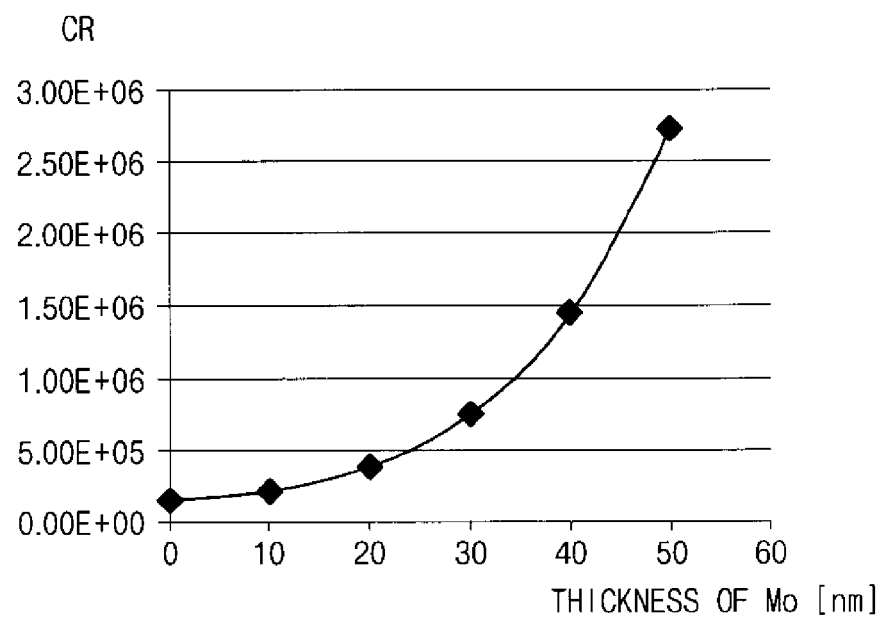
FIG. 8A is a graph illustrating a contrast ratio ("CR") of the polarizer of FIG. 1 according to thickness in nanometers (nm) of a second metal layer including molybdenum (Mo)

FIG. 8A is a graph illustrating a contrast ratio ("CR") of the polarizer of FIG. 1 according to thickness in nm of a second metal layer including molybdenum (Mo).

Referring to FIGS. 1 and 8A, the polarizer includes a substrate 100, a first metal layer 110 and a second metal layer 120. The first metal layer 110 includes aluminum (Al), and has a first thickness t1 which is 150 nm. A protrusion of the first metal layer 110 and the second metal layer 120 has a first width w1 which is 50 nm. A second width w2 which is a gap between adjacent protrusions is 50 nm. The second metal layer 120 includes molybdenum (Mo).

The graph of FIG. 8A shows the contrast ratio ("CR") in accordance with a second thickness t2 of the second metal layer 120. A direction of light is from the second metal layer 120 to the substrate 100. As the thickness of the second metal layer 120 including molybdenum (Mo) increases, the contrast ratio ("CR") is rapidly increased.

Figure 8B:
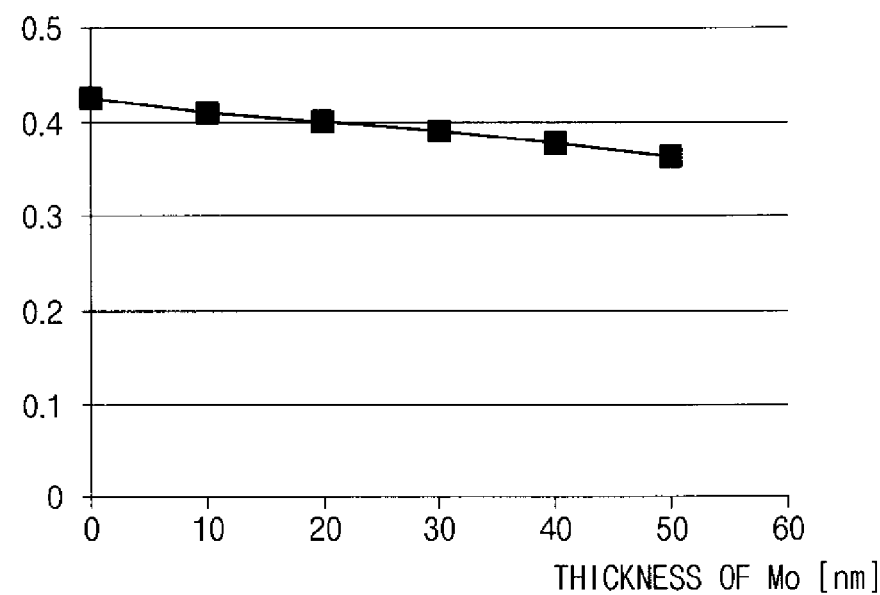
FIG. 8B is a graph illustrating a transmittance of the polarizer of FIG. 1 according to the thickness in nm of the second metal layer including molybdenum (Mo)

FIG. 8B is a graph illustrating a transmittance of the polarizer of FIG. 1 according to the thickness in nm of the second metal layer including molybdenum (Mo).

Referring to FIGS. 1 and 8B, the polarizer includes a substrate 100, a first metal layer 110 and a second metal layer 120. The first metal layer 110 includes aluminum (Al), and has a first thickness t1 which is 150 nm. A protrusion of the first metal layer 110 and the second metal layer 120 has a first width w1 which is 50 nm. A second width w2 which is a gap between adjacent protrusions is 50 nm. The second metal layer 120 includes molybdenum (Mo).

The graph of FIG. 8B shows the transmittance in accordance with a second thickness t2 of the second metal layer 120. A direction of light is from the second metal layer 120 to the substrate 100. As the thickness of the second metal layer 120 including molybdenum (Mo) increases, the transmittance is gradually decreased.

Figure 8C:
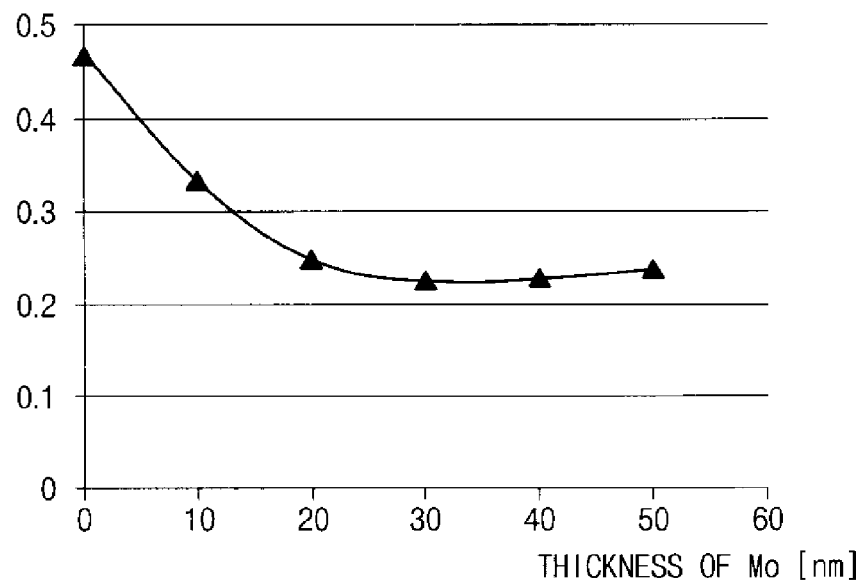
FIG. 8C is a graph illustrating a reflectance of the polarizer of FIG. 1 according to the thickness in nm of the second metal layer including molybdenum (Mo)

FIG. 8C is a graph illustrating a reflectance of the polarizer of FIG. 1 according to the thickness in nm of the second metal layer including molybdenum (Mo).

Referring to FIGS. 1 and 8C, the polarizer includes a substrate 100, a first metal layer 110 and a second metal layer 120. The first metal layer 110 includes aluminum (Al), and has a first thickness t1 which is 150 nm. A protrusion of the first metal layer 110 and the second metal layer 120 has a first width w1 which is 50 nm. A second width w2 which is a gap between adjacent protrusions is 50 nm. The second metal layer 120 includes molybdenum (Mo).

The graph of FIG. 8C shows the reflectance in accordance with a second thickness t2 of the second metal layer 120. A direction of light is from the second metal layer 120 to the substrate 100. As the thickness of the second metal layer 120 including molybdenum (Mo) increases from 0 nm to about 20 nm, the reflectance is rapidly decreased. However, as the thickness of the second metal layer 120 including molybdenum (Mo) further increases over about 20 nm, the reflectance is substantially constant.

Figure 9A:
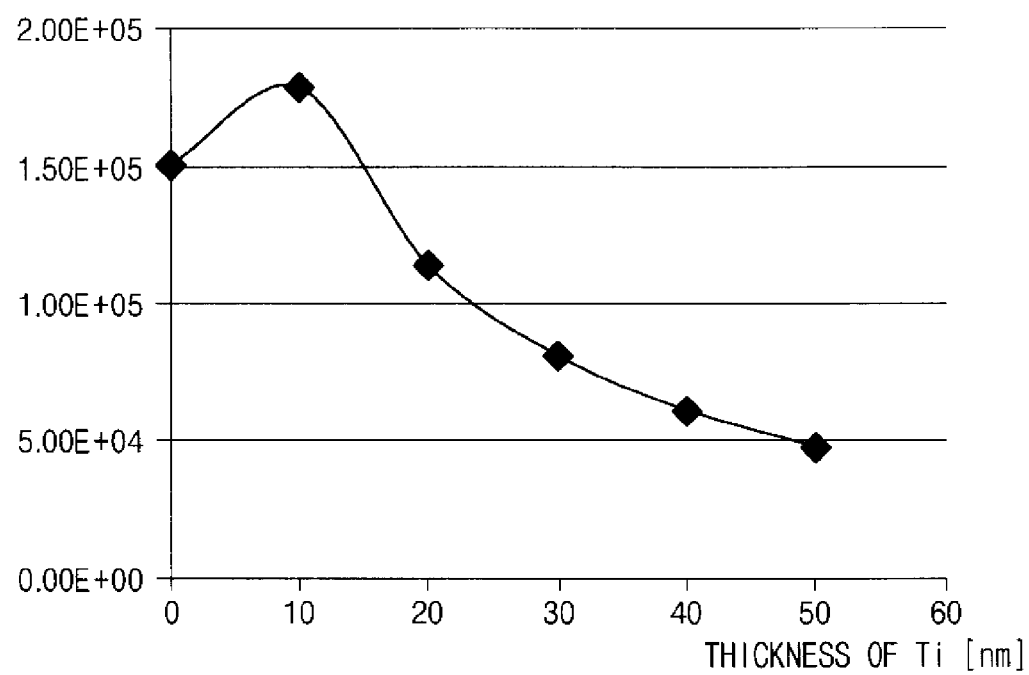
FIG. 9A is a graph illustrating a contrast ratio (CR) of the polarizer of FIG. 1 according to thickness in nm of a second metal layer including titanium (Ti)

FIG. 9A is a graph illustrating a contrast ratio ("CR") of the polarizer of FIG. 1 according to thickness of a second metal layer including titanium (Ti).

Referring to FIGS. 1 and 9A, the polarizer includes a substrate 100, a first metal layer 110 and a second metal layer 120. The first metal layer 110 includes aluminum (Al), and has a first thickness t1 which is 150 nm. A protrusion of the first metal layer 110 and the second metal layer 120 has a first width w1 which is 50 nm. A second width w2 which is a gap between adjacent protrusions is 50 nm. The second metal layer 120 includes of titanium (Ti).

The graph of FIG. 9A shows the contrast ratio ("CR") in accordance with a second thickness t2 of the second metal layer 120. A direction of light is from the second metal layer 120 to the substrate 100. As the thickness of the second metal layer 120 including titanium (Ti) increases from 0 nm to about 10 nm, the contrast ratio ("CR") is increased. However, as the thickness of the second metal layer 120 including titanium (Ti) is further increased over about 10 nm, the contrast ratio ("CR") is decreased.

Figure 9B:
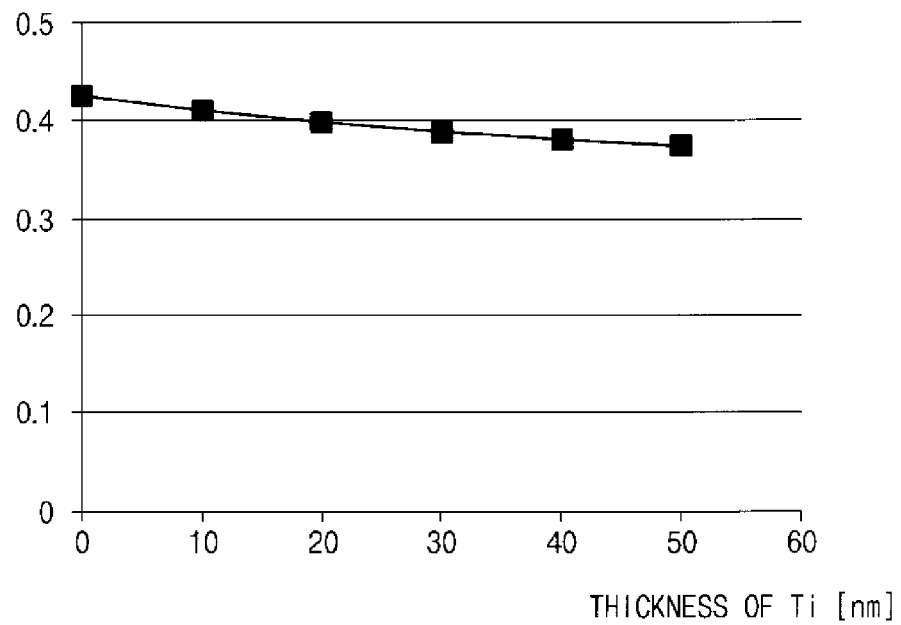
FIG. 9B is a graph illustrating a transmittance of the polarizer of FIG. 1 according to the thickness in nm of the second metal layer including titanium (Ti)

FIG. 9B is a graph illustrating a transmittance of the polarizer of FIG. 1 according to the thickness of the second metal layer including titanium (Ti).

Referring to FIGS. 1 and 9B, the polarizer includes a substrate 100, a first metal layer 110 and a second metal layer 120. The first metal layer 110 includes aluminum (Al), and has a first thickness t1 which is 150 nm. A protrusion of the first metal layer 110 and the second metal layer 120 has a first width w1 which is 50 nm. A second width w2 which is a gap between adjacent protrusions is 50 nm. The second metal layer 120 includes titanium (Ti).

The graph of FIG. 8B shows the transmittance in accordance with a second thickness t2 of the second metal layer 120. A direction of light is from the second metal layer 120 to the substrate 100. As the thickness of the second metal layer 120 including titanium (Ti) increases, the transmittance is gradually decreased.

Figure 9C:
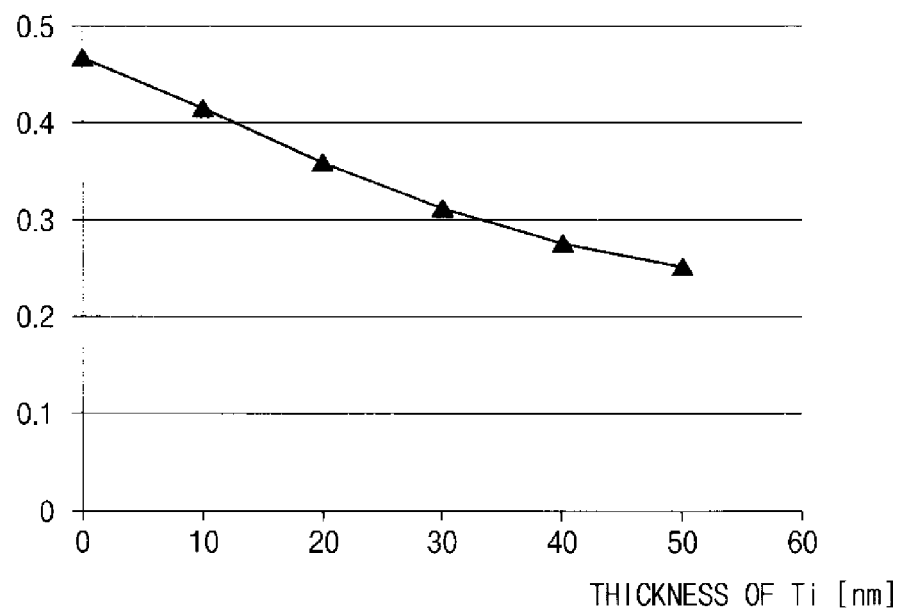
FIG. 9C is a graph illustrating a reflectance of the polarizer of FIG. 1 according to the thickness in nm of the second metal layer including titanium (Ti)

FIG. 9C is a graph illustrating a reflectance of the polarizer of FIG. 1 according to the thickness of the second metal layer including titanium (Ti).

Referring to FIGS. 1 and 9C, the polarizer includes a substrate 100, a first metal layer 110 and a second metal layer 120. The first metal layer 110 includes aluminum (Al), and has a first thickness t1 which is 150 nm. A protrusion of the first metal layer 110 and the second metal layer 120 has a first width w1 which is 50 nm. A second width w2 which is a gap between adjacent protrusions is 50 nm. The second metal layer 120 includes titanium (Ti).

The graph of FIG. 9C shows the reflectance in accordance with a second thickness t2 of the second metal layer 120. A direction of light is from the second metal layer 120 to the substrate 100. As the thickness of the second metal layer 120 including titanium (Ti) increases, the reflectance is gradually decreased.

Figure 10A:
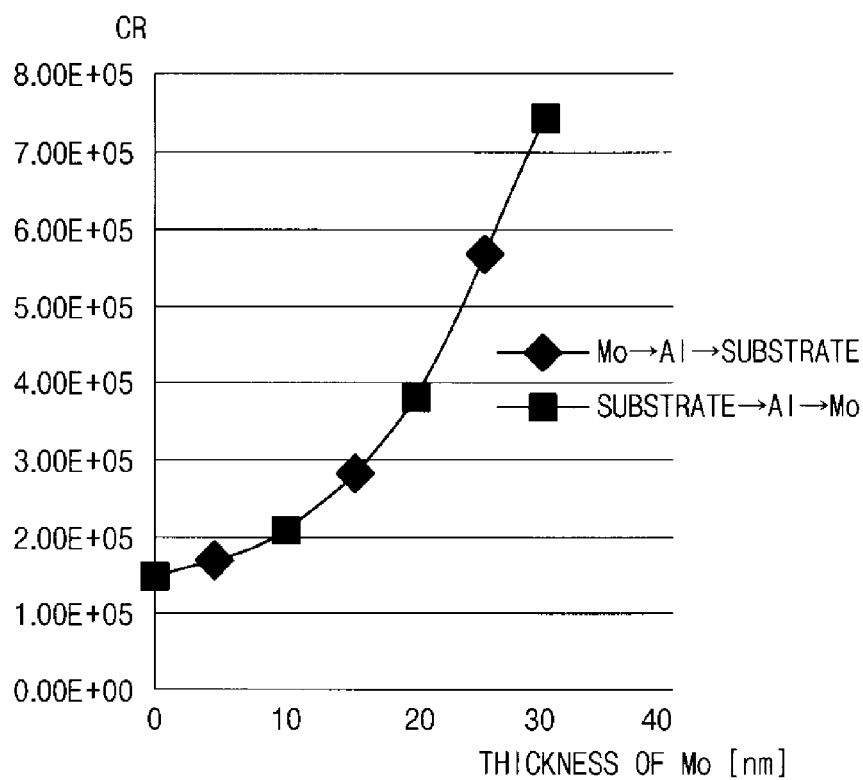
FIG. 10A is a graph illustrating a contrast ratio ("CR") of the polarizer of FIG. 1 according to a direction of light and the thickness in nm of the second metal layer including molybdenum (Mo)
Figure 10B:
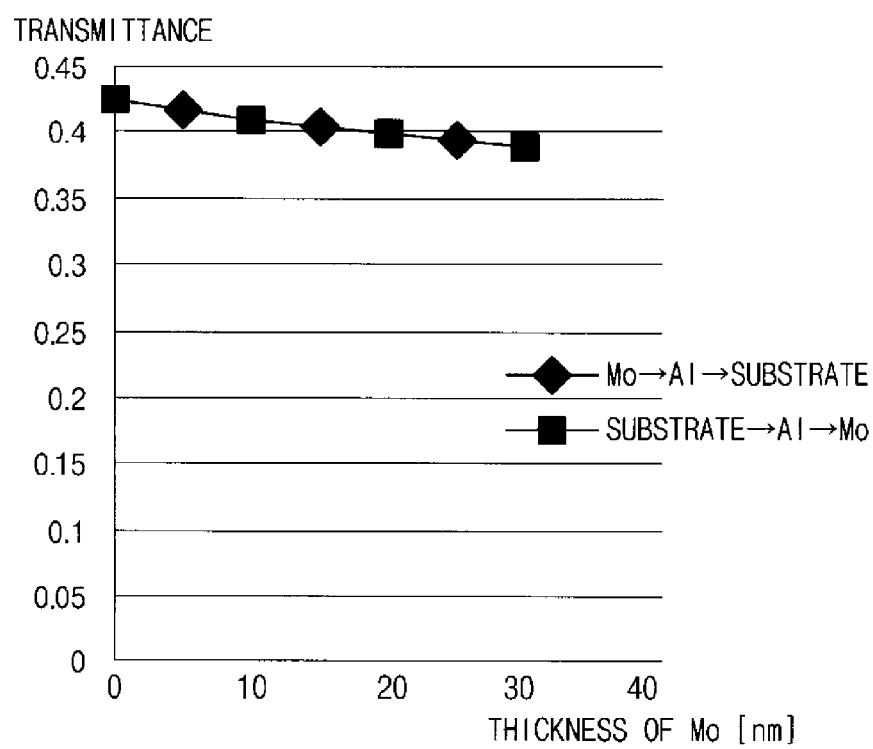
FIG. 10B is a graph illustrating a transmittance of the polarizer of FIG. 1 according to the direction of the light and the thickness in nm of the second metal layer including molybdenum (Mo)
Figure 10C:
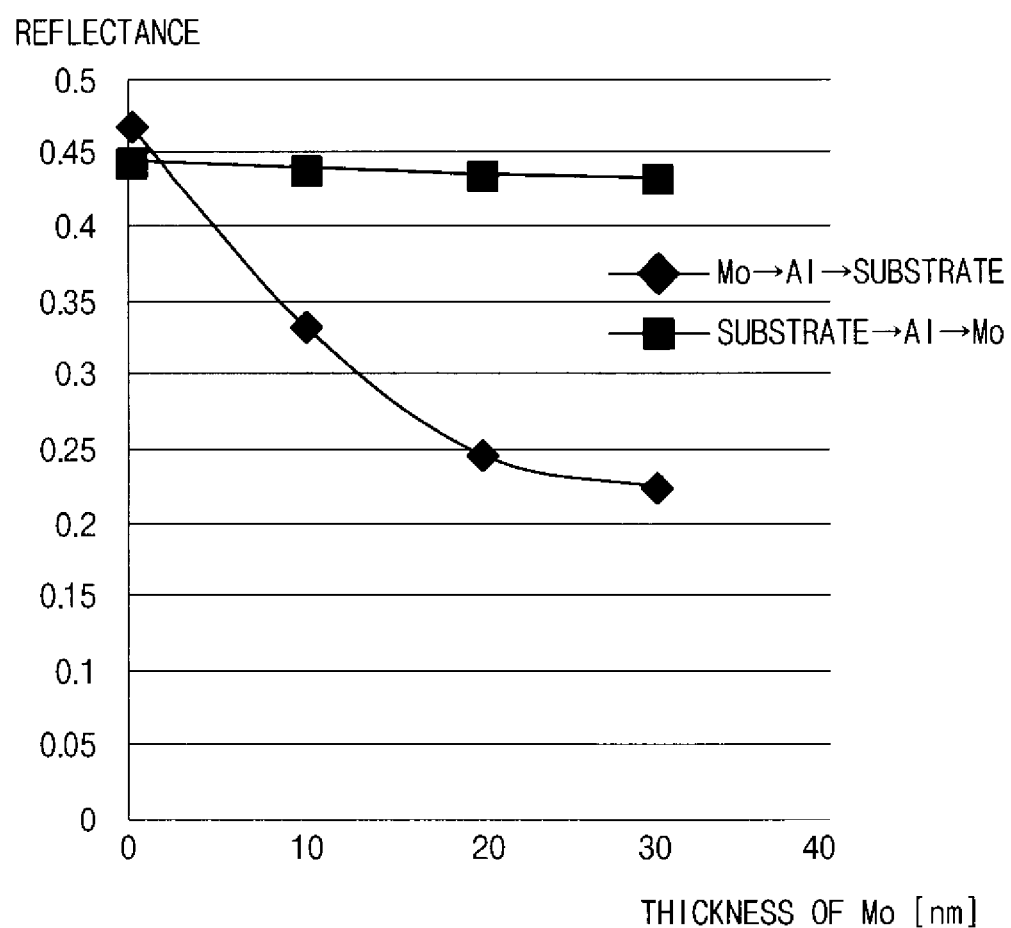
FIG. 10C is a graph illustrating a reflectance of the polarizer of FIG. 1 according to the direction of the light and the thickness in nm of the second metal layer including molybdenum (Mo).

FIG. 10A is a graph illustrating a contrast ratio ("CR") of the polarizer of FIG. 1 according to a direction of light. FIG. 10B is a graph illustrating a transmittance of the polarizer of FIG. 1 according to the direction of the light. FIG. 10C is a graph illustrating a reflectance of the polarizer of FIG. 1 according to the direction of the light.

Referring to FIGS. 1 and 10A to 10C, the polarizer includes a substrate 100, a first metal layer 110 and a second metal layer 120. The first metal layer 110 includes aluminum (Al), and has a first thickness t1 which is 150 nm. A protrusion of the first metal layer 110 and the second metal layer 120 has a first width w1 which is 50 nm. A second width w2 which is a gap between adjacent protrusions is 50 nm. The second metal layer 120 includes molybdenum (Mo).

The graph shows a first embodiment where light passes from the second metal layer 120 to the substrate 100 (Mo->Al->SUBSTRATE), and a second embodiment where light passes from the substrate 100 to the second metal layer 120 (SUBSTRATE->Al->Mo).

The graph of FIG. 10A shows the contrast ratio ("CR") in accordance with a second thickness t2 of the second metal layer 120. The contrast ratio ("CR") in the first embodiment (Mo->Al->SUBSTRATE) and the contrast ratio ("CR") in the second embodiment (SUBSTRATE->Al->Mo) coincide each other.

The graph of FIG. 10B shows the transmittance in accordance with the second thickness t2 of the second metal layer 120. The transmittance in the first embodiment (Mo->Al->SUBSTRATE) and the transmittance in the second embodiment (SUBSTRATE->Al->Mo) also coincide each other.

The graph of FIG. 10C shows the reflectance in accordance with a second thickness t2 of the second metal layer 120. In the first embodiment (Mo->Al->SUBSTRATE), as the thickness of the second metal layer 120 increases, the reflectance is rapidly decreased.

On the other hand, in the second embodiment (SUBSTRATE->Al->Mo), as the thickness of the second metal layer 120 increases, the reflectance is gradually decreased and becomes substantially constant.

Summing up FIGS. 10A to 10C, the lower polarizer or the upper polarizer (refers FIGS. 5 and 6) may be selected in consideration of the direction light will pass through the polarizer. When the direction of light is from the substrate 100 to the second metal layer 120 (SUBSTRATE->Al->Mo), a polarizer including respective layers ordered corresponding to the second embodiment direction of light (e.g., SUBSTRATE->first metal layer->second metal layer) may be used as the lower polarizer, since high reflectance is favorable to the lower polarizer. In addition, when the direction of light is from the second metal layer 120 to the substrate 100 (Mo->Al->SUBSTRATE), a polarizer including respective layers ordered corresponding to the first embodiment direction of light (e.g., second metal layer->first metal layer->SUBSTRATE) may be used as the upper polarizer., since low reflectance is favorable to the upper polarizer.

According to one or more exemplary embodiments of the invention, a polarizer includes a second metal layer disposed on a first metal layer, and the second metal layer includes molybdenum (Mo) or titanium (Ti). Thus, reliability of the polarizer may be improved by uniformly forming a metal layer of a wire grid pattern.

In addition, by adjusting a thickness of the second metal layer, a contrast ratio, transmittance and reflectance of the polarizer may be optimized.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A polarizer comprising:
   a substrate;
   a first metal layer disposed on the substrate, the first metal layer comprising a first metal material and a plurality of protrusions of a wire grid pattern of the polarizer, wherein each protrusion has a first width and adjacent protrusions are spaced apart from each other by a second width;
   a second metal layer disposed on each of the protrusions of the first metal layer, and comprising a second metal material, the second metal material comprising molybdenum (Mo), titanium (Ti), or molybdenum (Mo) and titanium (Ti); and
   a protecting layer planarizing the first and second metal layers,
   wherein
   the polarizer is provided in plural, and a first polarizer among the plural polarizers faces a second polarizer among the plural polarizers, and
   both the first metal layers or both the second metal layers of the facing first and second polarizers, are disposed between the facing second metal layers or the facing first metal layers of the facing first and second polarizers, respectively.

2. The polarizer of claim 1, wherein a thickness of the second metal layer is about 10 nanometers to about 20 nanometers, in a direction perpendicular to the substrate.

3. The polarizer of claim 1, wherein a ratio of the first width to the second width is about 1:1.

4. The polarizer of claim 1, wherein a ratio of the first width to a thickness of the first metal layer is about 1:1.

5. The polarizer of claim 4, wherein the first width is about 30 nanometers to about 60 nanometers.

6. The polarizer of claim 4, wherein
   providing a polymer material on the first and second metal materials forms a polymer layer,
   applying a mold to the polymer layer in a nano-imprint method forms a polymer layer pattern, and
   removing portions of the polymer layer pattern, the first metal material and the second metal material forms the plurality of protrusions of the wire grid pattern.

7. The polarizer of claim 1, wherein the first metal material comprises any one selected from aluminum (Al), gold (Au), silver (Ag), copper (Cu), chrome (Cr), steel (Fe) and nickel (Ni) and a combination thereof.

8. The polarizer of claim 1, further comprising a hard mask disposed on the second metal layer, and comprising silicon oxide (SiOx).

9. A display panel comprising:
   an array substrate comprising:
      a lower polarizer comprising:
         a first substrate;
         a lower first metal layer disposed on the first substrate and comprising a plurality of protrusions of a lower wire grid pattern of the lower polarizer,
         wherein each protrusion has a first width and adjacent protrusions are spaced apart from each other by a second width; and
         a lower second metal layer disposed on each of the protrusions of the lower first metal layer, and comprising molybdenum (Mo), titanium (Ti), or molybdenum (Mo) and titanium (Ti),
      a first insulating layer covering the lower first and the second metal layers;
      a gate electrode disposed on the first insulating layer;

a gate insulating layer disposed on the gate electrode;
a channel layer disposed on the gate insulating layer;
source and drain electrodes disposed on the channel layer; and
a protecting layer covering the source and drain electrodes,
an opposite substrate facing the array substrate, and comprising:
an upper polarizer comprising:
a second substrate;
an upper first metal layer disposed on the second substrate and comprising a plurality of protrusions of an upper wire grid pattern of the upper polarizer; and
an upper second metal layer disposed on each of the protrusions of the upper first metal layer, and comprising molybdenum (Mo), titanium (Ti), or molybdenum (Mo) and titanium (Ti), wherein the upper first metal layer is between the upper second metal layer and the second substrate, and
a second insulating layer covering the upper first and the second metal layers; and
a liquid crystal layer disposed between the array substrate and the opposite substrate.

10. The display panel of claim 9, wherein the upper and lower first metal layers comprise any one selected from aluminum (Al), gold (Au), silver (Ag), copper (Cu), chrome (Cr), steel (Fe) and nickel (Ni) and a combination thereof.

11. The display panel of claim 10, wherein each of a thickness of the upper second metal layer and a thickness of the lower second metal layer is about 10 nanometers to about 20 nanometers.

12. The display panel of claim 11, wherein
the array substrate further comprises a third substrate disposed between the first insulating layer and the gate electrode, and
the opposite substrate further comprises a fourth substrate disposed between the upper polarizer and the liquid crystal layer.

13. A display panel comprising:
an array substrate comprising:
a lower polarizer comprising:
a first substrate;
a lower second metal layer disposed on the first substrate, comprising molybdenum (Mo), titanium (Ti), molybdenum (Mo) and titanium (Ti), and comprising a plurality of protrusions of a lower wire grid pattern of the lower polarizer, wherein each protrusion has a first width and adjacent protrusions are spaced apart from each other by a second width; and
a lower first metal layer disposed on each of the protrusions of the lower second metal layer, wherein the lower second metal layer is between the lower first metal layer and the first substrate,
a first insulating layer covering the lower first and the second metal layers;
a gate electrode disposed on the first insulating layer;
a gate insulating layer disposed on the gate electrode;
a channel layer disposed on the gate insulating layer;
source and drain electrodes disposed on the channel layer; and
a protecting layer covering the source and drain electrodes,
an opposite substrate comprising:
an upper polarizer comprising:
a second substrate;
an upper second metal layer disposed on the second substrate, comprising molybdenum (Mo), titanium (Ti), or molybdenum (Mo) and titanium (Ti), and comprising a plurality of protrusions of an upper wire grid pattern of the upper polarizer; and
an upper first metal layer disposed on each of the protrusions of the upper second metal layer,
a second insulating layer covering the upper first and the second metal layers; and
a liquid crystal layer disposed between the array substrate and the opposite substrate.

14. The display panel of claim 13, wherein
the upper and lower first metal layer comprises aluminum (Al),
each of a thickness of the upper second metal layer and a thickness of the lower second metal layer is about 10 nanometers to about 20 nanometers,
a ratio of the first width to the second width is about 1:1, and
the first width is about 30 nanometers to about 60 nanometers.

15. A method of manufacturing a polarizer, the method comprising:
forming a first metal layer on a substrate;
forming a second metal layer comprising molybdenum (Mo), titanium (Ti), or molybdenum (Mo) and titanium (Ti), on the first metal layer;
forming a hard mask on the second metal layer;
forming a polymer layer on the hard mask;
forming a pattern comprising a plurality of protrusions, in the polymer layer by contacting and pressing a mold to the polymer layer;
removing a portion of the patterned polymer layer and a portion of the hard mask between the protrusions;
removing a portion of the first metal layer and a portion of the second metal layer between the protrusions; and
removing the polymer layer.

16. The method of claim 15, further comprising:
removing the hard mask after the removing the polymer layer.

17. The method of claim 15, wherein
each of the protrusions has a first width,
adjacent protrusions are spaced apart from each other by a second width, and
a ratio of the first width to the second width is about 1:1.

18. The method of claim 15, wherein a thickness of the second metal layer is about 10 nanometers to about 20 nanometers.

19. A method of manufacturing a polarizer comprising:
forming a second metal layer comprising molybdenum (Mo), titanium (Ti), or molybdenum (Mo) and titanium (Ti), on a substrate;
forming a first metal layer on the second metal layer;
forming a hard mask on the first metal layer;
forming a polymer layer on the hard mask;
forming a pattern comprising a plurality of protrusions, in the polymer layer by contacting and pressing a mold to the polymer layer;
removing a portion of the patterned polymer layer and a portion of the hard mask between the protrusions;
removing a portion of the first metal layer and a portion of the second metal layer between the protrusions; and
removing the polymer layer.

* * * * *